Jan. 4, 1966   J. P. LICHTENTHALER   3,226,882
TREE TIE
Filed Jan. 2, 1964
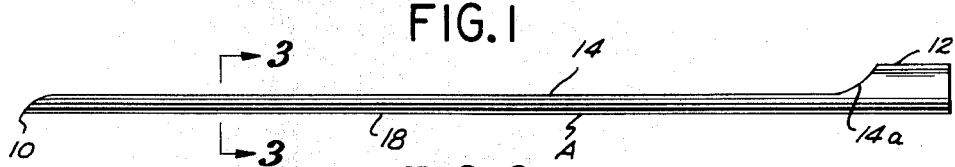
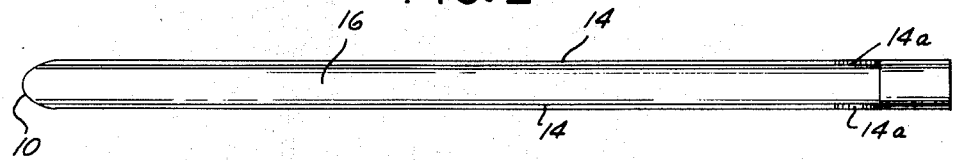
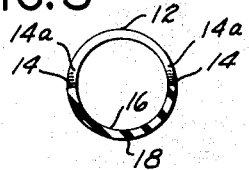
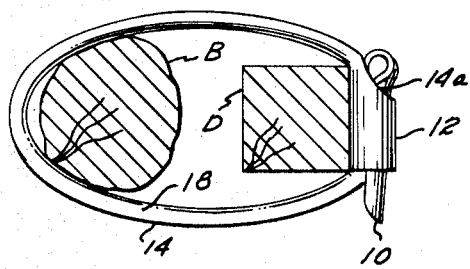
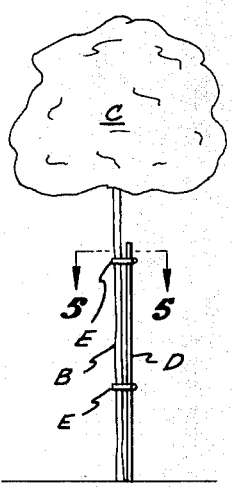
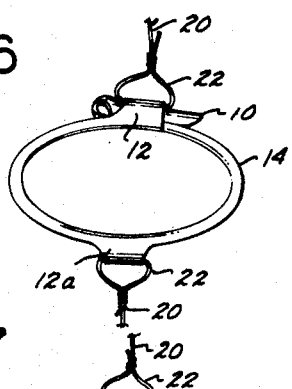
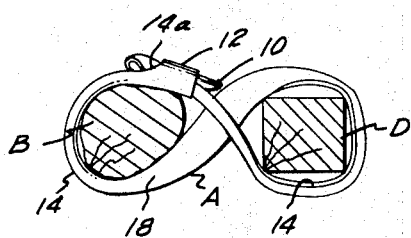
INVENTOR.
JAMES PAUL LICHTENTHALER
BY
William C. Babcock
ATTORNEY

United States Patent Office 3,226,882
Patented Jan. 4, 1966

3,226,882
TREE TIE
James Paul Lichtenthaler, 521 40th St., San Pedro, Calif.
Filed Jan. 2, 1964, Ser. No. 335,226
7 Claims. (Cl. 47—42)

The present invention relates generally to tying devices, and more particularly to a tree tie for supporting the trunk of a young tree in a fixed position.

A major object of the present invention is to provide an inexpensive tree tie of simple structure that is easy and quick to apply to a tree to support the trunk thereof, and one that will not cut into the bark during growth of the tree.

Another object of the invention is to supply a tree tie that can be fabricated from standard, commercially available materials, which does not deteriorate appreciably, even after prolonged exposure to the elements.

A further object of the inveniton is to furnish a tree tie that is quick and easy to remove from a tree-supporting position, to be re-used if so desired.

Yet still another object of the invention is to provide a tree tie that may be utilized to support a young tree from a rigid elongate member that projects upwardly from the ground.

Still a further object of the invention is to furnish a tree tie that may be easily adapted for use with wires and stakes to support a tree in a fixed position.

These and other objects and advantages of the present invention will become apparent from the following description of a first form thereof and certain alternate forms, and from the accompanying drawing illustrating the same, in which:

FIGURE 1 is a side elevational view of the first form of the tree tie;

FIGURE 2 is a top plan view of the tree tie shown in FIGURE 1;

FIGURE 3 is a transverse cross-sectional view of the tree tie shown in FIGURE 1, taken on the line 3—3 thereof;

FIGURE 4 is a side elevational view of a young tree supported at a fixed position relative to an upright by use of the tree ties shown in FIGURES 1–3 inclusive;

FIGURE 5 is a transverse cross-sectional view of the first form of tree tie in a supporting position, taken on the line 5—5 of FIGURE 4;

FIGURE 6 is a top plan view of a second form of tree tie which is used with wire to support a tree in a desired position;

FIGURE 7 is a top plan view of a third form of tree tie that is used with wire and three stakes to support a young tree in a fixed position; and FIGURE 8 is a top plan view of the first form of tree tie doubled into a figure eight configuration to support a young tree in a fixed position from an upright adjacent thereto.

With continuing reference to the drawing for the general arrangement of the first form of the invention, it will be seen in FIGURE 1 to include an elongate strip A of a flexible material, such as rubber or the like, with the strip having an arcuate transverse cross section, as may best be seen in FIGURE 3. Other materials that may be used in the fabrication of strip A are rubber, polymerized resins, metal, paper, cardboard, and the like.

The strip A has a pointed first end 10. The second end of strip A, as shown in FIGURES 1 and 2, develops into a tubular portion 12. The strip A (FIGURE 3) is defined by two longitudinally extending edges 14, an arcuate interior surface 16, and an outer arcuate surface 18. The arcuate transverse cross section of strip A is preferably no greater than 180°. The inner end of the tubular portion 12 develops into two downwardly tapering side wall sections 14a which merge into the edges 14, as may best be seen in FIGURES 1 and 2.

The first form of the invention as shown in FIGURES 1–3 inclusive, can be cut from a length of tubing formed from a flexible material, or if desired, can be molded from a suitable material such as a polymerized resin. As may be seen in FIGURE 3, the material defining the strip A is of substantial thickness. Also, it will be noted in the same figure that the inner surface 16 and the inner surface of the end portion 12 are of the same radius of curvature. This form of the tree tie is used to support the trunk B of a young tree C in a fixed position relative to an upright D, as illustrated in FIGURES 4 and 5.

The strip A is extended around the trunk B and upright D, with the outer side wall 18 located adjacent the trunk. The pointed end 10 of strip A is inserted through the tubular portion 12, and then moved relative to the tubular portion until the trunk B is disposed in a desired fixed position relative to the upright D. A section of strip A is then manually pulled through tubular portion 12 and doubled over, as may best be seen in FIGURE 5 with the edges 14 of the doubled over portion inside the tubular portion 12 being in abutting contact with one another as may be seen in FIGURES 6 and 7. The pointed end 10 is again extended through the tubular portion 12. That part of the strip A adjacent the pointed end 10 is thereafter gripped and pulled in a direction away from portion 12, with the doubled over portion deforming transversely to cinch against the interior surface of tubular portion 12 to hold the strip at the circumference to which it has been adjusted. When so adjusted as shown in FIGURE 5, the strip A will hold the trunk B in a fixed position relative to the upright D.

When it is desired to remove the strip A from the tied position (FIGURE 5), the operation above described is simply reversed and the strip removed from the trunk B and upright D. After removal thereof the tree tie E can be used for tying another tree in a fixed position relative to an upright D. Should it be desired to hold the trunk B in a desired fixed position relative to an upright D where the trunk cannot come into frictional contact with the upright, the first form of the tree tie E can be formed into the configuration shown in FIGURE 8.

A second form F of the invention is shown in FIGURE 6. This form of tree tie is identical to the first form E thereof, other than that a second tubular portion 12a is formed on the strip A opposite the tubular portion 12. In this form of the device, the strip A is extended around the trunk B of a tree C, and cinched in a fixed embracing circumferences as above described in connection with the first form thereof. With the second form F of the tree tie stakes (not shown) are driven into the ground in spaced relationship with the tree C, and wires 20 extended upwardly from these stakes to be formed into loops 22 that pass through the tubular portions 12 and 12a, as best shown in FIGURE 6.

A third form G of the tree tie is shown in FIGURE 7 which is identical to the first form thereof, except that the third form has two tubular portions 12b formed on the strip A, spaced approximately 120° from one another, as well as from the tubular portion 12. The third form G of the device is used with stakes (not shown), which have wires 20 extending upwardly therefrom to be formed into loops 22 that engage the tubular portion 12 and portions 12b, as shown in FIGURE 7. The second and third forms F and G of the invention (FIGURES 6 and 7) can be formed from a stock tubing of a resilient material such as a polymerized resin by cutting and slitting the tubular material, or if desired, they can be molded from a polymized resin, or other suitable material.

The use and operation of the three forms of tree tie have been described herein in detail, and need not be repeated.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claims.

I claim:

1. A tie for holding the trunk of a young tree in a fixed position relative to a rigid upright, including:

an elongate flexible strip of an arcuate transverse cross section and substantial thickness having first and second ends, which second end is formed into a tubular portion, the interior radius of curvature of which is the same as that of the inner surface of said strip, with said first end and a section of said strip adjacent thereto when said strip is disposed in an encircling position about said tree trunk and being threaded through said tubular portion and doubled over and said first end then reinserted through said tubular portion, with the edges of said doubled over portion of said strip inside said tubular portion being in abutting contact with one another, with at least a part of said doubled over portion deforming transversely sufficiently to cinch in said tubular portion when said reinserted end is moved in a direction away from said tubular portion.

2. A tie as defined in claim 1 wherein said strip is of sufficient length as to be arranged in a figure eight configuration when it encircles said trunk and upright.

3. A tie as defined in claim 1 wherein the degree of said arcuate transverse cross section is no greater than 180°.

4. A tie as defined in claim 1 wherein said first end is of pointed shape.

5. A tie as defined in claim 1 wherein the inner end of said tubular portion has two downwardly tapering side walls that merge into the upper edges of said strip.

6. A tie for holding the trunk of a tree at a fixed vertical position when said tie is engaged by the upper ends of two wires that extend upwardly from oppositely disposed fixed positions at the ground surface, including: an elongate flexible strip of arcuate transverse cross section that has first and second ends, which strip at a position intermediate said first and second ends and at said second end has two tubular portions, said strip, when disposed in an encircling position about said trunk with said tubular portions being engaged by loops formed in the upper parts of said wire, holding said trunk at said fixed position after said first end and a section of said strip adjacent thereto are threaded through said tubular portion on said second end and doubled over to occupy a cinching position in said tubular portion on said second end.

7. A tie for holding the trunk of a tree at a fixed vertical position when said tie is engaged by the upper ends of a plurality of wires that extend upwardly from fixed circumferentially spaced positions at the ground surface, including: an elongate flexible strip of arcuate transverse cross section that has first and second ends, which strip at a plurality of positions intermediate said first and second ends and at said second end has tubular portions, said strip, when disposed in an encircling position about said trunk with said tubular portions being engaged by loops formed in the upper parts of said wires, holding said trunk at said fixed position after said first end and a section of said strip adjacent thereto are threaded through said tubular portion on said second end and doubled over to occupy a cinching position in said tubular portion on said second end.

References Cited by the Examiner
UNITED STATES PATENTS

| | | | |
|---|---|---|---|
| 2,338,629 | 1/1944 | Felder et al. | 24—16 X |
| 2,979,794 | 4/1961 | Bartolo | 24—17 |

ABRAHAM G. STONE, *Primary Examiner.*

T. GRAHAM CRAVER, *Examiner.*